United States Patent
Beyer et al.

(10) Patent No.: US 10,848,386 B2
(45) Date of Patent: *Nov. 24, 2020

(54) METHOD AND APPARATUS FOR AUTOMATIC IDENTIFICATION OF AN OUTAGE OF A NETWORK NODE

(71) Applicant: SIEMENS AKTIENGESELLSCHAFT, Munich (DE)

(72) Inventors: Dagmar Beyer, Munich (DE); Denis Krompaß, Munich (DE); Sigurd Spieckermann, Neukeferloh (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 45 days.

This patent is subject to a terminal disclaimer.

(21) Appl. No.: 15/770,787

(22) PCT Filed: Dec. 8, 2015

(86) PCT No.: PCT/EP2015/079016
§ 371 (c)(1),
(2) Date: Apr. 25, 2018

(87) PCT Pub. No.: WO2017/097347
PCT Pub. Date: Jun. 15, 2017

(65) Prior Publication Data
US 2018/0324053 A1 Nov. 8, 2018

(51) Int. Cl.
*H04L 12/24* (2006.01)
*G06F 17/16* (2006.01)
*H04L 12/44* (2006.01)

(52) U.S. Cl.
CPC ............ *H04L 41/142* (2013.01); *G06F 17/16* (2013.01); *H04L 12/44* (2013.01); *H04L 41/065* (2013.01);
(Continued)

(58) Field of Classification Search
CPC .... H02J 3/00; H02J 13/0055; H02J 2003/007; H04L 41/12; H04L 41/064; H04L 41/065;
(Continued)

(56) References Cited

U.S. PATENT DOCUMENTS 9,037,896 B2 * 5/2015 Addepalli ............. H04L 41/064
714/4.1
9,534,928 B2 * 1/2017 Taft .......................... G01D 4/002
(Continued)

FOREIGN PATENT DOCUMENTS

AU    2012241193 B2    6/2015
JP    WO2009090939 A1 *  5/2011 ........... G06F 21/552
(Continued)

OTHER PUBLICATIONS

PCT International Search Report and Written Opinion of International Searching Authority dated Jan. 9, 2016 corresponding to PCT International Application No. PCT/EP2015/079016 filed Aug. 12, 2015.
(Continued)

*Primary Examiner* — George C Neurauter, Jr.
(74) *Attorney, Agent, or Firm* — Schmeiser, Olsen & Watts LLP

(57) ABSTRACT

A method for identifying automatically an inner node within a hierarchical network causing an outage of a group of leaf nodes at the lowest hierarchical level, the method including providing an outage state matrix representing an outage state of leaf nodes at the lowest hierarchical level; decomposing the state matrix into a first probability matrix indicating for
(Continued)

each inner node the probability that the inner node forms the origin of an outage at the lowest hierarchical level of the hierarchical network and into a second probability matrix indicating for each leaf node at the lowest hierarchical level of the hierarchical network the probability that an inner node forms a hierarchical superordinate node of the respective leaf node at the lowest hierarchical level of the hierarchical network and evaluating the first probability matrix to identify the inner node having caused the outage of the group of leaf nodes.

15 Claims, 2 Drawing Sheets

(52) U.S. Cl.
CPC ........ *H04L 41/0677* (2013.01); *H04L 41/064* (2013.01); *H04L 41/12* (2013.01); *H04L 41/22* (2013.01); *Y04S 40/164* (2013.01); *Y04S 40/166* (2013.01)

(58) Field of Classification Search
CPC ... H04L 41/0677; H04L 41/142; H04L 41/22; H04L 43/0817; H04L 67/1089; H04L 12/44; Y02E 60/76; Y04S 40/164; Y04S 40/166; Y04S 40/22; G06F 17/16
See application file for complete search history.

(56) References Cited

U.S. PATENT DOCUMENTS

| | | | |
|---|---|---|---|
| 9,641,452 B2* | 5/2017 | Lu | .......................... H04L 47/788 |
| 10,547,513 B2 | 1/2020 | Beyer et al. | |
| 2003/0185150 A1* | 10/2003 | Matsumoto | ......... H02J 13/0079 |
| | | | 370/217 |
| 2006/0080417 A1* | 4/2006 | Boutboul | ................ H04L 41/12 |
| | | | 709/220 |
| 2008/0025227 A1* | 1/2008 | Puttu | ................... H04L 12/1895 |
| | | | 370/244 |
| 2008/0256149 A1* | 10/2008 | Bansal | .................. G06F 9/5044 |
| 2009/0024549 A1* | 1/2009 | Johnson | .................. H04L 43/00 |
| | | | 706/46 |
| 2009/0281674 A1* | 11/2009 | Taft | ......................... G01D 4/002 |
| | | | 700/286 |
| 2011/0107155 A1 | 5/2011 | Hirose et al. | |
| 2012/0120790 A1* | 5/2012 | Berkowitz | ............... H02H 7/30 |
| | | | 370/225 |
| 2013/0346057 A1* | 12/2013 | Lin | .......................... H02J 3/00 |
| | | | 703/18 |
| 2014/0129746 A1 | 5/2014 | Zhou et al. | |
| 2014/0129876 A1 | 5/2014 | Addepalli et al. | |
| 2014/0198630 A1* | 7/2014 | Nof | ......................... H04L 45/28 |
| | | | 370/216 |
| 2015/0006946 A1* | 1/2015 | Littlefield | ........... H04L 41/0686 |
| | | | 714/4.1 |
| 2016/0077507 A1* | 3/2016 | Sheble | ................... G06Q 10/06 |
| | | | 700/295 |
| 2017/0244967 A1* | 8/2017 | Wang | ..................... H04N 19/13 |
| 2019/0075027 A1 | 3/2019 | Beyer et al. | |

FOREIGN PATENT DOCUMENTS

WO    WO-2014067142 A1 *   5/2014
WO        2017097346 A1     6/2017

OTHER PUBLICATIONS

PCT International Search Report and Written Opinion for PCT International Application No. PCT/EP2015/079011, dated Aug. 4, 2016, 13 pages.
Office Action (dated Apr. 15, 2019) for U.S. Appl. No. 15/767,209, filed Apr. 10, 2018.
Office Action (dated Jul. 23, 2019) for U.S. Appl. No. 15/767,209, filed Apr. 10, 2018.
Notice of Allowance (dated Sep. 18, 2019) for U.S. Appl. No. 15/767,209, filed Apr. 10, 2018.

* cited by examiner

METHOD AND APPARATUS FOR AUTOMATIC IDENTIFICATION OF AN OUTAGE OF A NETWORK NODE

CROSS-REFERENCE TO RELATED APPLICATIONS

This application claims priority to PCT Application No. PCT/EP2015/079016, having a filing date of Dec. 8, 2015, the entire contents of which are hereby incorporated by reference.

FIELD OF TECHNOLOGY

The following relates to a method to identification of an inner network node within a hierarchical network, in particular a power supply network, causing an outage of a group of leaf nodes at the lowest hierarchical level of the respective hierarchical network.

BACKGROUND

Most energy transmission systems or power supply networks are equipped with a control system to control equipment of the energy transmission system. The control system can be combined with a data acquisition system to acquire information about the state of the equipment of the power supply system. Monitoring tools can be used for power quality monitoring and/or detection of disturbances within the power supply system. These tools are usually not available in an energy distribution system and therefore system operators often have only a very limited insight into the actual operation state of the respective power supply network. Outages in the energy distribution system are often only tracked through customer complaints in the location of the occurred disturbance and must be inferred by an operator of the system manually. A limited knowledge of the actual topology of the complex network increases the complexity to identify the origin of an outage within the power supply network. This can lead to a delayed restoration and repair of assets in particular equipment devices which caused the outage in the power supply network.

SUMMARY

An aspect relates to providing a method and apparatus for identifying automatically an origin of an outage within a complex network.

The method according to the first aspect of embodiments of the present invention are provided for identifying automatically an inner node of the hierarchical network causing an outage of a group of leaf nodes at the lowest hierarchical level of said hierarchical network, said method comprising the steps of providing an outage state matrix representing an outage state of leaf nodes at the lowest hierarchical level of said hierarchical network, decomposing the state matrix into a first probability matrix indicating for each inner node of the hierarchical network the probability that the respective inner node forms the origin of an outage at the lowest hierarchical level of the hierarchical network and into a second probability matrix indicating for each leaf node at the lowest hierarchical level of the hierarchical network the probability that an inner nodes forms a hierarchical superordinate node of the respective leaf node at the lowest hierarchical level of the hierarchical network and evaluating the first probability matrix to identify the inner node having caused the outage of the group of leaf nodes.

In a possible embodiment of the method according to the first aspect of embodiments of the present invention, the hierarchical network is a hierarchical power supply network.

In a further possible embodiment of the method according to the first aspect of embodiments of the present invention, the hierarchical power supply network comprises at its lowest hierarchical level leaf nodes formed by smart meters generating event data streams indicating a current outage state of the leaf nodes of the power supply network.

In a further possible embodiment of the method according to the first aspect of embodiments of the present invention, the generated event data streams are supplied to a processing unit which is adapted to derive the outage state matrix from the received event data streams.

In a still further possible embodiment of the method according to the first aspect of embodiments of the present invention each event data stream generated by a smart meter forming a leaf node of said hierarchical power supply network consists of event data triples.

In a possible embodiment of the method according to the first aspect of embodiments of the present invention, each event data triple of an event data stream comprises a timestamp indicating a time when an event is detected, a smart meter identifier identifying the smart meter generating the respective event data stream and, an event identifier identifying an event type of the respective event.

In a further possible embodiment of the method according to the first aspect of embodiments of the present invention, the outage state matrix derived from event data streams is a two-dimensional matrix, wherein the first dimension of the outage state matrix represents time and the second dimension of the outage state matrix represents smart meters forming leaf nodes at the lowest hierarchical level of the power supply network.

In a further possible embodiment of the method according to the first aspect of embodiments of the present invention, each column of said two-dimensional outage state matrix represents states of the respective smart meter at particular points in time and each row of said outage state matrix represents the states of all smart meters at a particular point in time.

In a further possible embodiment of the method according to the first aspect of embodiments of the present invention, the outage state matrix is a binary state matrix, wherein a first logic value indicates that the respective smart meter is in the outage state at a particular point in time and wherein a second logic value indicates that the respective smart meter is not in the outage state at a particular point in time.

In a further possible embodiment of the method according to the first aspect of embodiments of the present invention, event data streams generated by smart meters forming leaf nodes at the lowest hierarchical level of the hierarchical power supply network are transmitted continuously or periodically via a data network to a remote controller comprising a processing unit, which derives the outage state matrix from the received event data streams and stores the derived outage state matrix in a memory unit for further processing.

In a further possible embodiment of the method according to the first aspect of embodiments of the present invention, the determined network topology of the hierarchical network is output via a user interface.

Embodiments of the invention provides according to the second aspect an apparatus for identification of an inner node within a hierarchical network causing an outage state of a group of leaf nodes at the lowest hierarchical level of the hierarchical network, said apparatus comprising a memory unit adapted to store an outage state matrix representing an outage state of leaf nodes at the lowest hierarchical level of the hierarchical network and, a processing unit adapted to decompose the state matrix into a first probability matrix indicating for each inner node of the hierarchical network the probability the respective inner node forms the origin of an outage at the lowest hierarchical level of the hierarchical network and into a second probability matrix indicating for each leaf node as the lowest hierarchical level of the hierarchical network the probability that an inner node forms a hierarchical superordinate node of the respective leaf node at the lowest hierarchical level of the hierarchical network, wherein the decomposed first probability matrix is evaluated by said processing unit to identify the inner node having caused the outage of said group of leaf nodes.

Embodiments of the invention provides according to a further aspect a network controller of a network comprising an apparatus according to the second aspect of embodiments of the present invention, wherein the processing unit of the network controller is adapted to derive the outage state matrix from event data streams received from smart meters of said network.

Embodiments of the invention further provide according to a further aspect a hierarchical power supply network comprising the network controller according to the third aspect of embodiments of the present invention, wherein the hierarchical power supply network comprises at its lowest hierarchical level leaf nodes formed by smart meters adapted to generate the event data stream indicating a current outage state of the leaf nodes of the hierarchical power supply network.

In a possible embodiment of the hierarchical power supply network according to the fourth aspect of embodiments of the present invention, the event data streams generated by smart meters forming the leaf nodes at the lowest hierarchical level of the power supply network are transmitted via a data network to a data interface of the network controller of the hierarchical power supply network.

BRIEF DESCRIPTION

Some of the embodiments will be described in detail, with reference to the following figures, wherein like designations denote like members, wherein.

DETAILED DESCRIPTION

Figure 1:
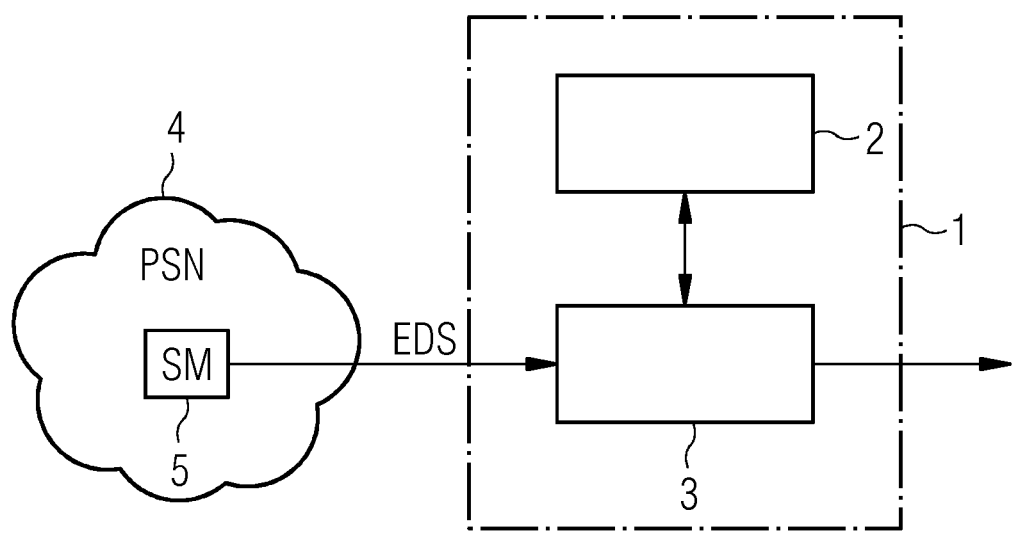
FIG. 1 shows a block diagram of an apparatus for identification of an inner node within a hierarchical network according to embodiments of the present invention.

As shown in the block diagram in FIG. 1 an apparatus 1 for identification of an inner node within a hierarchical network causing an outage state of a group of leaf nodes at the lowest hierarchical level of the hierarchical network comprises in the illustrated embodiment a memory unit 2 and a processing unit 3. The memory unit 2 is adapted to store an outage state matrix X representing an outage state of leaf nodes at the lowest hierarchical level of the hierarchical network 4 shown in FIG. 1.

The hierarchical network 4 is in a possible embodiment a complex power supply network comprising a plurality of network nodes. In a possible embodiment leaf nodes of the hierarchical network 4 are formed by smart meters 5 supplying event data streams EDS to an input interface of the apparatus 1 of the processing unit 3. The hierarchical power supply network 4 comprises at its lowest hierarchical level leaf nodes formed by smart meters 5 adapted to generate the event data streams EDS indicating a current outage state of the leaf nodes of the hierarchical power supply network 4. Event data streams EDS generated by the smart meters 5 forming the leaf nodes at the lowest hierarchical level of the power supply network 4 are transmitted in possible embodiment via a data network to a data input interface of the apparatus 1 as shown in FIG. 1. The apparatus 1 can be integrated in a network controller of the hierarchical power supply network 4.

The processing unit 3 of the apparatus 1 is adapted to de-compose the stored outage state matrix X into a first probability matrix $\hat{W}$ and into a second probability matrix $\hat{H}$. The first probability matrix $\hat{W}$ indicates for each inner node of the hierarchical network the probability that the respective inner node forms the origin of an outage at the lowest hierarchical level of the hierarchical network 4. The second probability matrix $\hat{H}$ indicates for each leaf node as the lowest hierarchical level of the hierarchical network 4 the probability that an inner node forms a hierarchical superordinate node of the respective leaf node at the lowest hierarchical level of the hierarchical network 4. The processing unit 3 is further adapted to process a decomposed first probability matrix $\hat{W}$ to identify the inner node having caused an outage of a group of leaf nodes.

In a possible embodiment the identified inner node can be output by an interface of the apparatus 1 to an operator of the power supply network 4 or to a further processing unit forming a further evaluation of the received data.

In a possible embodiment outages can be recorded by service delivery points of the affected smart meter 5 allowing the apparatus 1 to access this information data in a reliable and sufficiently fast way. The processing unit 3 of apparatus 1 processes the received smart meter data for locating the origin of outages in a tree-structured hierarchical power supply network 4 based on event data streams EDS generated at the leaf nodes of the respective hierarchical power supply network 4.

In a possible embodiment each event data stream EDS generated by a smart meter 5 forming a leaf node of the hierarchical power supply network 4 can consist of event data triples. Each event data triple of the event data stream EDS can comprise a timestamp TS indicating a time when an event EV is detected, a smart meter identifier SM-ID identifying the smart meter 5 generating the respective event data stream EDS and an event identifier EV-ID identifying an event type of the respective event EV.

The outage state matrix X stored in the memory unit 3 of the apparatus 1 is derived from received event data streams EDS. In a possible embodiment the outage state matrix X stored in the memory unit 2 is a two-dimensioned matrix, wherein a first dimension of the outage state matrix X represents time and a second dimension of the outage state matrix X represents smart meters 5 forming leaf nodes at the lowest hierarchical level of the power supply network 4. Each column of the two-dimensional outage state matrix X can represent the state of the respective smart meter 5 at particular points in time. Each row of the two-dimensional outage state matrix X can represent the states of all smart meters 5 at a particular point in time.

In a further possible embodiment the outage state matrix X can be formed by a binary state matrix. In a possible embodiment a first logical value indicates that the respective smart meter 5 of the power supply network 4 is in the outage state at a particular point in time and a second logical value indicates that the respective smart meter 5 of the power supply network 4 is not in the outage state at a particular point in time.

In a possible embodiment the event data stream EDS generated by a smart meter 5 consists of data triples (timestamp TS, smart meter ID and event ID) wherein the event ID can take two values representing an outage event, i.e. the smart meter detects a power loss, and a restoration event, i.e. the smart meter detects a restoration of the power. The event data triples of all smart meters 5 within the power supply network 4 can be sorted in a possible embodiment by the timestamps TS in an ascending order and converted into a sparse binary outage state matrix X wherein each column of the outage state matrix X represents the state of the respective smart meter at a particular point in time. While iterating over the sorted event data triples, a new row can be appended at the bottom of the outage state matrix X whenever any of the smart meters 5 records an event EV. The new row of the outage state matrix X captures the state of all smart meters at the particular instant according to the encoding scheme. All-zero rows, i.e. no smart meter 5 is in the outage state at a particular point in time, can be omitted from the outage state matrix X. The resulting representation, i.e. the generated outage matrix X, is typically a very sparse matrix because only a small fraction of the smart meters 5 are normally in an outage state. By storing only the non-zero values, i.e. the logic high values, this data representation is feasible even for a large number of smart meters 5 within the distributed power supply network 4.

In a possible embodiment the event data streams EDS generated by the smart meters 5 forming leaf nodes at the lowest hierarchical level of the hierarchical power supply network 4 are transmitted continuously to the processing unit 3 of the apparatus 1. In a possible alternative embodiment the event data streams EDS generated by the smart meters 5 can be transmitted periodically to the processing unit 3 of the apparatus 1.

In a possible embodiment the event data streams EDS are transported via a data network to a remote apparatus 1 integrated in a network controller of the power supply network 4. The processing unit 3 of the apparatus 1 is adapted to derive the outage state matrix X from the received event data streams EDS and to store the derived outage state matrix X into the memory unit 2 for further processing.

A tree topology of the hierarchical network 4 can be identified in a possible embodiment from the outage state matrix X using a matrix factorization algorithm for decomposing the outage state matrix X in two different matrixes $\hat{W}$, $\hat{H}$, i.e. into a first probability matrix $\hat{W}$ and into a second probability matrix $\hat{H}$. The first probability matrix $\hat{W}$ indicates for each inner node of the hierarchical network 4 the probability that the respective inner node forms the origin of an observed outage at the lowest hierarchical level of the hierarchical network 4. The second probability matrix $\hat{H}$ indicates for each leaf node at lowest hierarchical level of the hierarchical network 5 the probability that an inner node forms a hierarchical superordinate node of the respective leaf node at the lowest hierarchical level of the hierarchical network 4. The factorization performed by the processing unit 3 decomposes the outage state matrix X into the first probability matrix $\hat{W}$ and into the second probability matrix $\hat{H}$, wherein $\hat{W} \in [0,1]^{m \times r}$ and $\hat{H} \in [0,1]^{r \times n}$ with r being the number of non-leaf nodes in the tree topology such that $\hat{W}\hat{H}=X$. Each row of $\hat{W}$ sums up to 1. $\hat{W}_{ik}$ represents the probability that the $k^{th}$ non-leaf node is the origin of an outage at a time index i. Constraining $\Sigma_k \hat{W}_{ik}=1$ implies mutually exclusive outage origins which is a sensible assumption for a power supply network. The value $\hat{H}_{kj}$ represents the probability that the k-th non-leaf node is a parent or superordinate node of the $j^{th}$ smart meter or leaf node. Thus, $\hat{X}_{ij}=\Sigma_k \hat{W}_{ik}\hat{H}_{kj}$ is the probability that an outage has been observed by the $j^{th}$ smart meter 5 at a time index i. To ensure the value range of $\hat{W}$ as well as the row sum constraint enforced on matrix $\hat{W}$, the matrix $\hat{W}$ is parameterized as $$\hat{W}_{ij} = [softmax(W_{i,:})]_j = \frac{\exp(W_{ij})}{\Sigma_l \exp(W_{il})}.$$

Further, the second matrix $\hat{H}$ can be constructed such that $\hat{H}_{kj}=1$ if the $j^{th}$ leaf node is located underneath the $k^{th}$ non-leaf node, else $\hat{H}_{kj}=0$. The values of the matrix W are determined in a possible embodiment through maximum log-likelihood estimation by minimizing the cross-entropy between the target value $X_{ij}$ and the estimated value $\hat{X}_{ij}$, i.e. the differentiable objective.

$E(W,H)=\Sigma_{ij}[X_{ij} \log(\hat{X}_{ij})+(1-X_{ij}) \log(1-\hat{X}_{ij})]$ can be minimized in a possible embodiment via a gradient-based optimization method. Scalability of the method and robustness of the optimization against convergence to local optima can be achieved by performing lock-free multithreaded stochastic optimization and by introducing additional noise to the update direction similar to simulated annealing.

The following table depicts a learning algorithm which can be performed in a possible implementation by the processing unit 3 of the apparatus 1 according to an aspect of embodiments of the present invention.

--- function FACTORIZE(X $\in \{0, 1\}^{m \times n}$, r $\in \mathbb{N}$, $\alpha \in \mathbb{R}^+$, p $\in ]0.5, 1]$)

Initialize W $\in \mathbb{R}^{m \times r}$ while not converged do
    Draw i $\in \{1, \ldots, m\}$ uniformly at random
    Draw j $\in \{1, \ldots, n\}$ uniformly at random
    Draw $\beta \in \{-1, 1\}$ at random with P [$\beta$ = 1] = p
    Compute forward pass $$\hat{W}_{ik} \leftarrow \frac{\exp\left(W_{ik} - \max_t W_{it}\right)}{\Sigma_l \exp\left(W_{il} - \max_t W_{it}\right)}$$

$$\hat{X}_{ij} \leftarrow \sum_k \hat{W}_{ik} \hat{H}_{kj}$$

Compute error
$E \leftarrow -X_{ij} \ln(\hat{X}_{ij}) - (1 - X_{ij}) \ln(1 - \hat{X}_{ij})$
Compute backward pass $$\frac{\partial E}{\partial \hat{X}_{ij}} \leftarrow \frac{1 - X_{ij}}{1 - \hat{X}_{ij}} - \frac{X_{ij}}{\hat{X}_{ij}}$$

$$\frac{\partial E}{\partial \hat{W}_{ik}} \leftarrow \frac{\partial E}{\partial \hat{X}_{ij}} \hat{H}_{kj}$$

$$\frac{\partial E}{\partial W_{ik}} \leftarrow \frac{\partial E}{\partial \hat{W}_{ik}} \hat{W}_{ik} - \hat{W}_{ik} \sum_l \frac{\partial E}{\partial \hat{W}_{il}} \hat{W}_{il}$$

Update parameters $$W_{ik} \leftarrow W_{ik} - \beta \alpha \frac{\partial E}{\partial W_{ik}}$$

$$W_{ik} \leftarrow W_{ik} - \frac{1}{r} \sum_l W_{il}$$

return $\hat{W}$

After the calculation process has converged the origin of an outage observed by a smart meter at a particular point in time can be identified as a probability distribution of the non-leaf nodes found in the corresponding row of the matrix $\hat{W}$.

Figure 3:
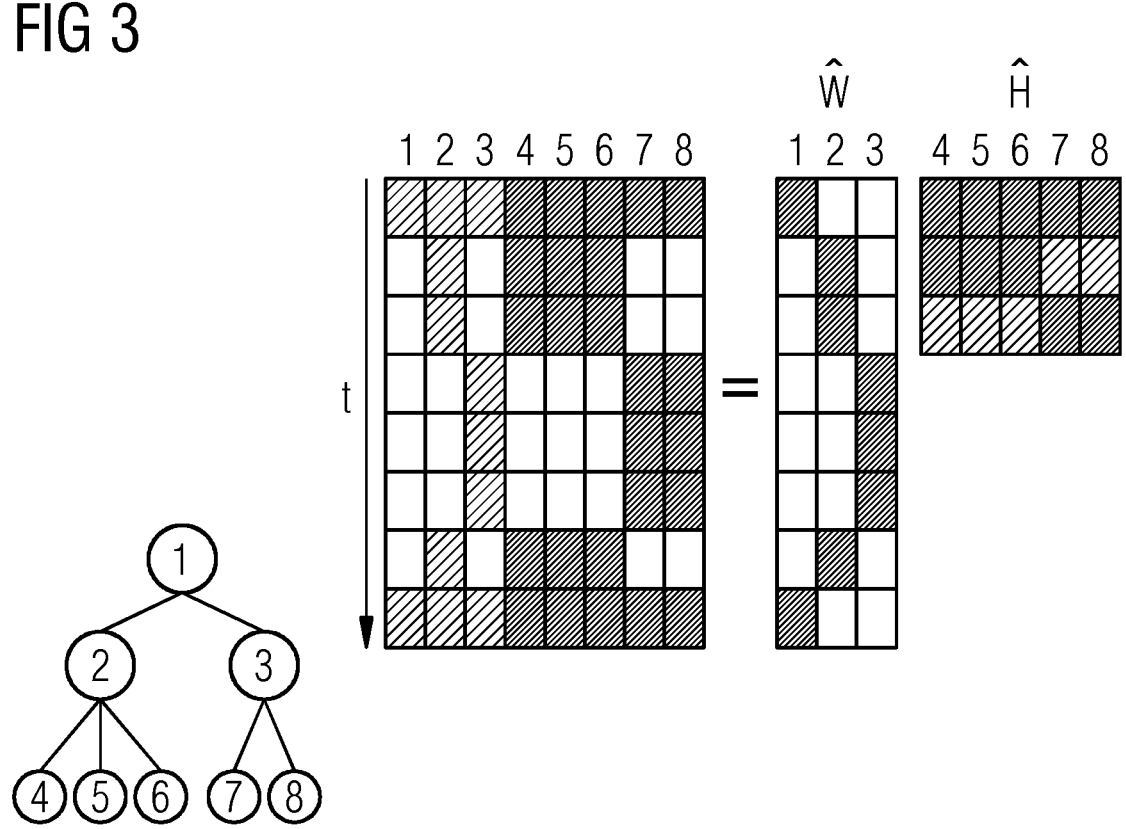
FIG. 3 shows a diagram for illustrating a data representation of a simple network and a possible factorization scheme as used in the method and apparatus according to embodiments of the present invention.

FIG. 3 depicts a possible data representation as well as the factorization that can be employed by the processing unit 3. FIG. 3 shows a simple exemplary network comprising eight nodes including three non-leaf nodes and five leaf nodes which can be formed by smart meters 5. Columns 1-3 of the left-hand side matrix represent observations made by non-leaf nodes which might not be accessible in practice. Using only columns 4-8, which are the observations made by the smart meters 5 forming leaf nodes of the hierarchical network the first probability matrix $\hat{W}$ is obtained through factorization performed by the processing unit 3 of the apparatus 1 according to the algorithm illustrated above. In the algorithm illustrating an exemplary embodiment of the factorization scheme used by the processing unit 3 of the apparatus 1. $\alpha$ indicates a learning rate, $\beta$ determines the sign of the current update direction under the above-described noisy update scheme, m indicates time instances, n indicates the number of smart meters and r indicates a number of inner nodes within the hierarchical network. Further i is a row index and j is a column index.

Figure 2:
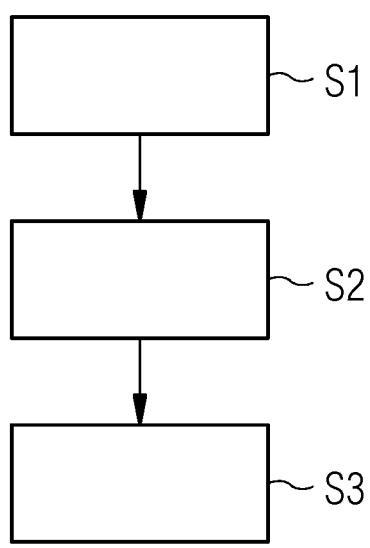
FIG. 2 shows a flow chart of a method for identifying automatically an inner node with a hierarchical network according to embodiments of the present invention.

FIG. 2 illustrates a possible exemplary embodiment of a method for identifying automatically an inner node within a hierarchical network causing an outage of a group of leaf nodes at the lowest hierarchical level of the hierarchical network such as a power supply network.

In a first step S1 an outage state matrix X representing an outage state of leaf nodes at the lowest hierarchical level of the hierarchical network is provided. The outage state matrix X can be stored in a memory unit. The outage state matrix X represents in a possible embodiment the outage state of leaf nodes formed by smart meters 5 within a power supply network 4.

In a further step S2 the outage state matrix X is decomposed into a first probability matrix $\hat{W}$ and into a second probability matrix $\hat{H}$. The decomposition of the outage state matrix X can be performed in a calculation process performed by the processing unit 3. The decomposed first probability matrix $\hat{W}$ indicates for each inner node of the hierarchical network that the respective inner node forms the origin of an outage at the lowest hierarchical level of the hierarchical network 4. The second decomposed probability matrix $\hat{H}$ indicates for each leaf node as the lowest hierarchical level of the hierarchical network 4 the probability that an inner node forms a hierarchical superordinate node of the respective leaf node at the lowest hierarchical level of the hierarchical network 4.

In the further step S3 the first probability matrix $\hat{W}$ is evaluated to identify the inner node having caused the outage of the group of leaf nodes in the network 4.

In a possible embodiment the determined network topology NT of the hierarchical network is output via an interface to the network operator or to a further processing unit.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for identifying automatically an inner node within a hierarchical network causing an outage of a group of leaf nodes at a lowest hierarchical level of the hierarchical network, the method comprising the steps of:
   (a) providing an outage state matrix representing an outage state of leaf nodes at the lowest hierarchical level of the hierarchical network;
   (b) decomposing the outage state matrix into a first probability matrix indicating for each inner node of the hierarchical network a probability that a respective inner node forms an origin of an outage at the lowest hierarchical level of the hierarchical network and into a second probability matrix indicating for each leaf node at the lowest hierarchical level of the hierarchical network a probability that a respective inner node forms a hierarchical superordinate node of the respective leaf node at the lowest hierarchical level of the hierarchical network; and
   (c) evaluating the first probability matrix to identify the inner node having caused the outage of the group of leaf nodes.

2. The method according to claim 1, wherein the hierarchical network is a hierarchical power supply network.

3. The method according to claim 2, wherein the hierarchical power supply network comprises at its lowest hierarchy level leaf nodes formally smart meters generating event data streams indicating a current outage state of the leaf nodes of the hierarchical power supply network.

4. The method according to claim 3, wherein the generated event data streams are supplied to a processing unit which derives the outage state matrix from the received event data streams.

5. The method according to claim 3, wherein each event data stream generated by a smart meter forming a leaf node of the hierarchical power supply network consists of event data triples.

6. The method according to claim 5, wherein each event data triple of an event data stream comprises:
   a timestamp indicating a time when an event is detected;
   a smart meter identifier identifying the smart meter generating the respective event data stream; and
   an event identifier identifying an event type of the respective event.

7. The method according to claim 2, wherein the outage state matrix derived from event data streams is a two-dimensional matrix,
   wherein a first dimension of the outage state matrix represents time and wherein a second dimension of the outage state matrix represents smart meters forming leaf nodes at the lowest hierarchical level of the hierarchical power supply network.

8. The method according to claim 7, wherein each column of the outage state matrix represents a state of a respective smart meter at particular points in time and wherein each row of the outage state matrix represents states of all smart meters at a particular point in time.

9. The method according to claim 7, wherein the outage state matrix is a binary state matrix, wherein a first logic value indicates that the respective smart meter is in the outage state at a particular point in time; and wherein a second logic value indicates that the respective smart meter is not in the outage state at a particular point in time.

10. The method according to claim 3, wherein event data streams generated by smart meters forming leaf nodes at the lowest hierarchical level of the hierarchical power supply network are transmitted continuously or periodically via a data network to a remote controller comprising a processing unit which derives the outage state matrix from the received event data streams and stores the derived outage state matrix in a memory unit for further processing.

11. The method according to claim 1, wherein a network topology of the hierarchical network is output via a user interface.

12. An apparatus for identification of an inner node within a hierarchical network causing an outage state of a group of leaf nodes at a lowest hierarchical level of the hierarchical network, the apparatus comprising:
(a) a memory unit adapted to store an outage state matrix representing an outage state of leaf nodes at the lowest hierarchical level of the hierarchical network; and
(b) a processing unit adapted to decompose the stored state matrix into a first probability matrix indicating for each inner node of the hierarchical network a probability that a respective inner node forms an origin of an outage at the lowest hierarchical level of the hierarchical network and into a second probability matrix indicating for each leaf node at the lowest hierarchical level of the hierarchical network a probability that a respective inner node forms a hierarchical superordinate node of the respective leaf node at the lowest hierarchical level of the hierarchical network;
wherein the decomposed first probability matrix is evaluated by the processing unit to identify the inner node having caused the outage of the group of leaf nodes.

13. A network controller of a network comprising an apparatus according to claim 12, wherein the processing unit of the network controller is adapted to derive the outage state matrix from event data streams received from smart meters of the hierarchical network.

14. A hierarchical power supply network comprising the network controller according to claim 13, wherein the hierarchical power supply network comprises at its lowest hierarchical level leaf nodes formed by smart meters adapted to generate event data streams indicating a current outage state of the leaf nodes of the hierarchical power supply network.

15. The hierarchical power supply network according to claim 14, wherein the event data streams generated by smart meters forming the leaf nodes at the lowest hierarchical level of the hierarchical power supply network are transmitted via a data network to a data interface of the network controller of the hierarchical power supply network.

* * * * *